(12) United States Patent
Chen

(10) Patent No.: US 6,806,850 B2
(45) Date of Patent: Oct. 19, 2004

(54) PORTABLE ELECTRONIC DEVICE HAVING PROJECTION SCREEN

(76) Inventor: Shane Chen, 1821 NW. 8$^{th}$ Ave., Camas, WA (US) 98607

( * ) Notice: Subject to any disclaimer, the term of this patent is extended or adjusted under 35 U.S.C. 154(b) by 41 days.

(21) Appl. No.: 09/792,687

(22) Filed: Feb. 23, 2001

(65) Prior Publication Data

US 2002/0118151 A1 Aug. 29, 2002

(51) Int. Cl.$^7$ .................................................. G09G 5/00
(52) U.S. Cl. ............................... 345/7; 353/72; 353/79
(53) Field of Search .......................... 345/905, 80–100, 345/7, 8; 359/461; 353/122, 72, 74, 79; 361/681, 680, 679; 340/752

(56) References Cited

U.S. PATENT DOCUMENTS

| | | | |
|---|---|---|---|
| 5,128,662 A | * 7/1992 | Failla | 340/752 |
| 5,218,389 A | 6/1993 | Harlon | |
| 5,260,867 A | * 11/1993 | Maeser et al. | 379/93.17 |
| 5,483,250 A | * 1/1996 | Herrick | 345/32 |
| 5,510,806 A | 4/1996 | Busch | |
| 5,696,625 A | 12/1997 | Malifaud et al. | |
| 5,847,748 A | 12/1998 | Laughlin | |
| 6,144,550 A | * 11/2000 | Weber et al. | 361/681 |

FOREIGN PATENT DOCUMENTS

| | | | |
|---|---|---|---|
| JP | 07-134606 | 12/1996 | |
| JP | 09133792 | 8/1998 | |
| WO | WO 01/56275 A2 | * 1/2000 | ............ H04N/5/74 |

* cited by examiner

Primary Examiner—Dennis-Doon Chow
Assistant Examiner—Srilakshmi K. Kumar
(74) Attorney, Agent, or Firm—Steven J. Adamson

(57) ABSTRACT

A reduced size personal computer comprises a base having first and second base portions movably connected to one another. In the preferred embodiment the two base portions are hingedly connected and fold together much like a book. In the extended orientation, the first and second base portions both lie flat on a working surface, such as a tabletop. The first portion typically includes a keypad and a mouse region, and the second portion typically includes internal operating components such as a motherboard and disk drives. A retractable display screen is extended upwardly from a storage compartment in the second base portion to its full, extended height. The screen may be flexible and manufactured with a light-directing texture. Due to the retractable nature of the display screen, the portable computer disclosed herein has a footprint in a stowed orientation that is smaller than the extended size of the screen. The computer may further comprise an extendable projector adapted to project an image onto the screen in the extended position, and which is received within the storage compartment in the base in the stowed orientation.

20 Claims, 5 Drawing Sheets

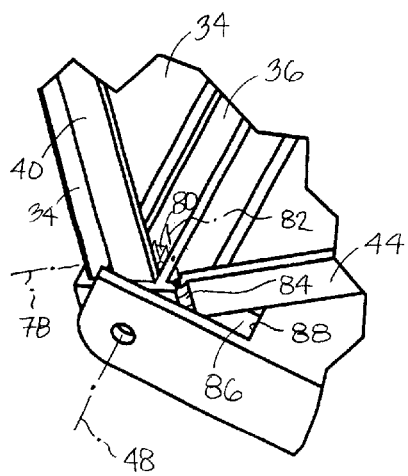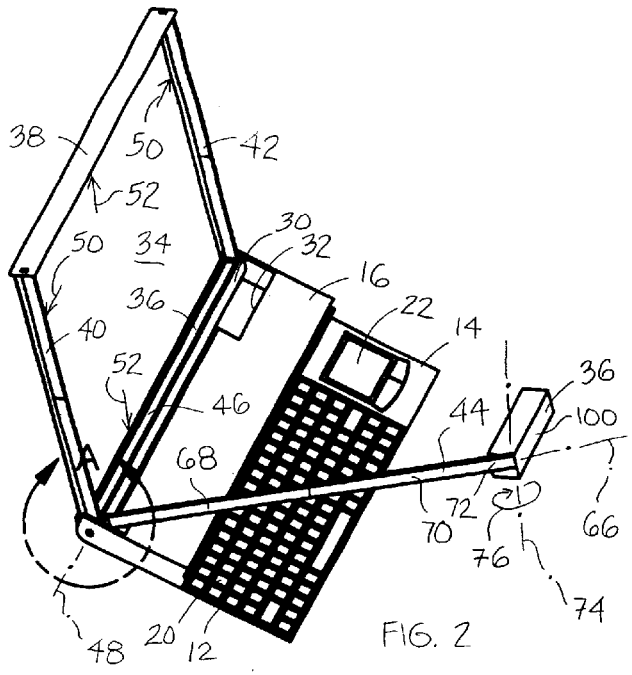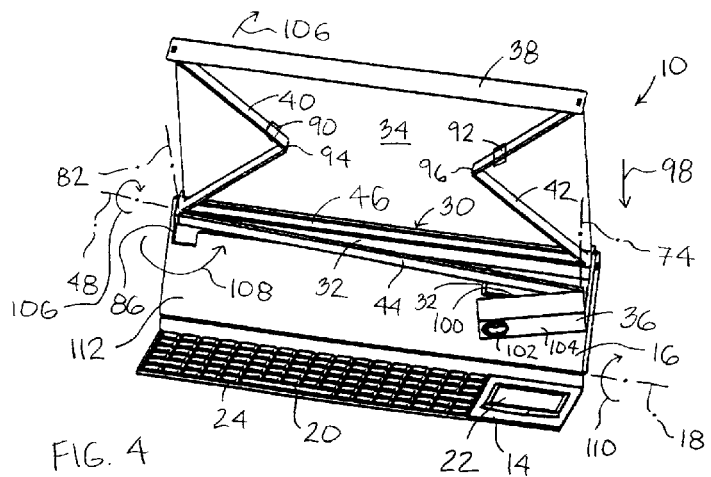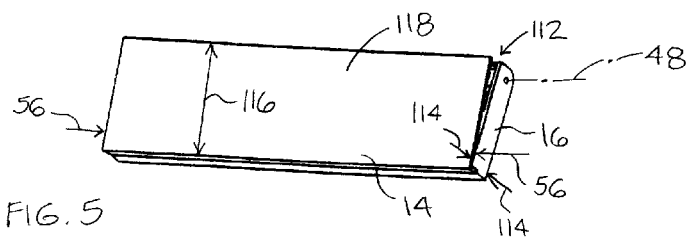

PORTABLE ELECTRONIC DEVICE HAVING PROJECTION SCREEN

TECHNICAL FIELD

The present invention relates to a reduced size personal computer and, more particularly, to a reduced size personal computer including a retractable display such that said computer in the stowed orientation has a depth dimension less than a depth dimension of said display in an extended orientation. The retractable screen has efficient light display characteristics so that a low power projector, such as a light emitting diode projector, may be used.

BACKGROUND OF THE INVENTION

Conventional personal computers, especially portable computers, typically comprise a rectangular base that houses internal operating components such as a motherboard, a hard disk drive, a battery pack, and a floppy disk drive. The rectangular base typically comprises a book type shape which, when opened, includes a keyboard in the lower half of the base, and a display screen in the upper half of the base. The height of the computer in a stowed orientation typically comprises the height of the upper and lower halves positioned adjacent one another. The display screen is manufactured of a rigid material so that the width and depth dimensions of the computer in the stowed orientation typically are defined by the width and depth dimensions of the display screen.

Due to the fixed dimensions of the rigid screen, size reduction efforts have been concentrated in reducing the height, i.e., the thickness, of the computer, such as by manufacturing a thin display screen. In one prior art computer, shown in U.S. Pat. No. 5,510,806, to Busch, the rigid screen comprises a thin top plate which is folded onto the lower half of the base during storage. A pop-up liquid crystal display projector is incorporated into the lower half of the base, wherein the projector projects an image onto the rigid screen. However, this prior art computer has several disadvantages. Namely, the power required to operate the lamp for the liquid crystal display projector is quite high for a portable device, and the liquid crystal display projector generates a relatively large amount of heat which must be dissipated. The thin, flat computer is also susceptible to damage during transport. Moreover, even though the height of the computer is reduced, the width and depth dimensions are still fixed by the screen size that is desired. In other words, the computer base has a footprint contiguous with the full size of the screen.

Accordingly, there is a need for a more compact and robust computer that will withstand rough handling during transport. In addition, there is a need for a personal computer having a footprint in a stowed orientation that is less than the full size of its display screen when the screen is in a viewing orientation. There is also a need for a personal computer that can be manufactured in a size smaller than heretofore known, and which requires less power and generates less heat than prior art computers.

SUMMARY OF THE INVENTION

An object of the present invention, therefore, is to provide a reduced size personal computer.

Yet another object of the present invention is to provide a reduced size personal computer that can withstand rough conditions during transport.

Still another object of the present invention is to provide a reduced size personal computer that has a footprint in a stowed orientation that is less than the full size of its display screen when the screen is in a viewing orientation.

A further object of the present invention is to provide a reduced size personal computer that requires a reduced amount of power for operation.

Another object of the present invention is to provide a reduced size personal computer that generates a reduced amount of heat during operation.

The present invention provides a reduced size personal computer comprising a base having first and second base portions movably connected to one another. In the preferred embodiment the two base portions are hingedly connected and fold together much like a book. In the extended orientation, the first and second base portions both lie flat on a working surface, such as a tabletop. The first portion typically includes a keypad and a mouse region, and the second portion typically includes the internal operating components such as the motherboard, battery pack and disk drives. A retractable display screen is extended upwardly from a storage compartment in the second base portion to its full, extended height. Due to the retractable nature of the display screen, the portable computer disclosed herein has a footprint in a stowed orientation that is smaller than the extended size of the screen. In one series of embodiments the screen is manufactured of a flexible material and is retracted into the computer base in a variety of methods, such as around a cylindrical drum, backwardly over itself via a pulley system, and in an accordion-type folded arrangement. In another embodiment, the screen may comprise multiple rigid sections that fold together in an accordion-type arrangement or backwardly over itself via a pulley system. The computer may further comprise one or more extendable projectors adapted to project an image onto the screen in the extended position, wherein the projector is received in a storage compartment within the base when the computer is in the stowed orientation.

BRIEF DESCRIPTION OF THE DRAWINGS

FIG. 2 is a perspective view of another embodiment of the computer;

FIG. 3 is a detailed view of section A of the computer of FIG. 2;

FIG. 4 is a perspective view of the computer of FIG. 1 in an initial stage of movement from the extended orientation to the stowed orientation;

FIG. 5 is a perspective view of the computer of FIG. 1 in a later stage of movement from the extended orientation to the stowed orientation;

DETAILED DESCRIPTION OF THE PREFERRED EMBODIMENTS

Figure 1:
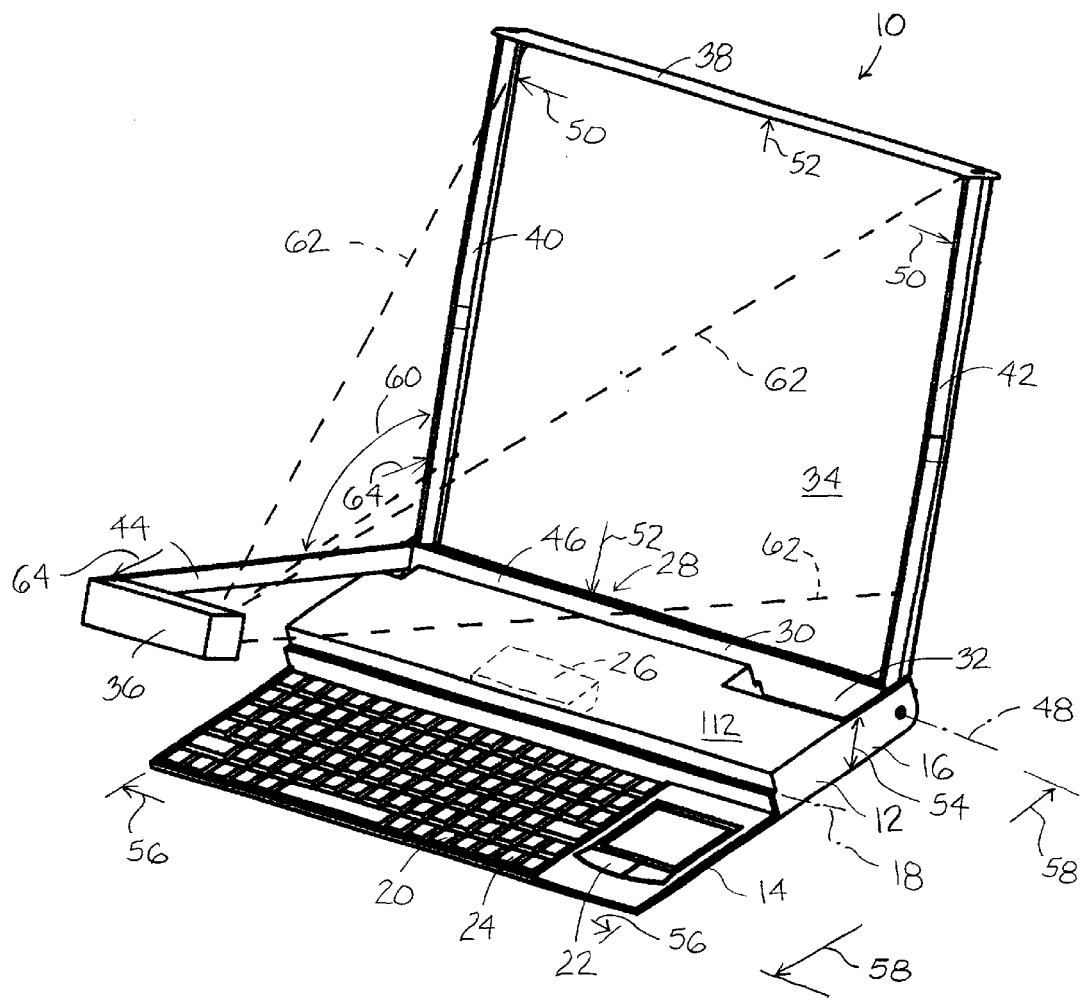
FIG. 1 is a perspective view of the reduced size computer in the operational orientation.

FIG. 1 shows a preferred embodiment of computer 10 comprising a base 12 including a first base portion 14 and a second base portion 16. For purposes of this disclosure, the term computer includes typical personal computers, video display devices, projectors, portable televisions, hand-held video games, and other such devices adapted for displaying optical images to an observer. First and second base portions 14 and 16 typically are hingedly connected together along a pivot axis 18 so that the two base portions fold together much like a book. In other embodiments, the base may comprise a single unit having a footprint smaller than a footprint of the screen in an extended position, as will be described below. First base portion 14 typically includes operator input devices such as a keypad 20 and a mouse device 22. Keypad 20 includes a plurality of keys 24 as known in the art, wherein keys 24 may comprise manually depressible keys or individual touch pad sensors, so as to receive input from an operator (not shown). Similarly, mouse device 22 may comprise a manually movable mouse ball, a joystick or a touch pad (as shown).

Second base portion 16 typically comprises therein internal operational components 26 such as a motherboard, a hard disk drive, a battery pack, and a floppy disk drive. Along a rear region 28 of the base, base portion 16 includes a screen storage compartment 30 and a projector storage compartment 32. The two compartments typically each comprise different sections of one large storage compartment. A screen 34 extends upwardly and outwardly, and a projector 36 extends forwardly and outwardly, from base portion 16 in the extended or operational orientation as shown. Screen 34 is supported by a top support 38 and two side supports 40 and 42. Projector 36 is supported by a support arm 44. Screen side supports 40 and 42, and projector support arm 44 are each connected to a support base 46 pivotally connected along a pivot axis 48 to second base portion 16.

In the extended orientation as shown in FIG. 1, screen 34 has a width dimension 50 and a depth dimension 52. As one example, width 50 may be approximately twelve inches whereas depth 52 may be approximately ten inches. The dimensions of screen 34, however, may be any size as is desired. The footprint of the screen is defined as its depth multiplied by its width. In the operational orientation as shown, base 12 has a height dimension 54, a width dimension 56, which typically corresponds to width dimension 50 of the screen, and a depth dimension 58. The footprint of the base in the operational or extended position is its width 56 multiplied by its depth 58. Due to the retractable nature of screen 34 as will be discussed more fully below, depth dimension 52 of the extended screen is not constrained by the choice of depth dimension 58 of extended base 12.

In the preferred embodiment as shown, projector support arm 44 is connected to the support base 46 such that the projector arm 44 and side support arm 40 of the screen define an angle 60 of approximately ninety degrees. However, any angle may be chosen by the manufacturer during molding of support base 46 so as to increase the efficiency of light projected onto screen 34 by projector 36 and viewed by an operator. Projector 36 defines a region of light emission, represented by dash lines 62, that is projected onto screen 34. In the embodiment shown, projector 36 is off center (so that a viewer can easily see over the projector to the screen) with respect to depth 52 of screen 34 so that optical correction of light emission 62 will be undertaken, so as to compensate for such off center light projection, as is well known in the art. However, due to the relatively short distance 64 from projector 36 to screen 34, and due to the relatively short dimension of depth 52 of the screen, correction of the light emitted from projector 36 is not required.

FIG. 2 is a perspective view of another embodiment of computer 10 wherein projector support arm 44 may be extended inwardly and outwardly along an axis 66 of support arm 44. In this particular embodiment, support arm 44 includes first and second telescoping portions 68 and 70 wherein portion 70 may be extended toward support base 46 thereby enclosing first portion 68 of the support arm. Projector 36 typically is pivotally connected to an outer end 72 of support arm 44 about a pivot axis 74 so that projector 36 may be moved in an arc 76 about axis 74 for storage of the projector. In another embodiment, projector support arm 44 may comprise multifolding sections which may fold together in a fan or accordion type arrangement.

FIG. 3 is a detail of section A of FIG. 2 showing the connection of projector support arm 44 and screen side support arm 40 to support base 46. Side support arm 40 is connected to support base 46 so that the screen support arm pivots with respect to the support base about a pivot axis 78. In particular, in the embodiment shown, side support arm 40 is secured to support base 46 by a hinge 80 having a hinge pin that defines pivot axis 78. Of course, other connection means as known in the art may also be utilized. Screen support arm 42 is connected to the support base in a mirror image fashion. Projector support arm 44 is secured to support base 46 so that the projector support arm pivots with respect to the support base about a pivot axis 82. In particular, in the embodiment shown, projector support arm 44 is secured to support base 46 by a hinge 84 having a hinge pin that defines pivot axis 82. In the embodiment shown, hinge 84 comprises an end portion of projector support arm 44 and an outwardly extending portion of support base 46. Of course, other connection means as known in the art may also be utilized.

Still Referring to FIG. 3, in the preferred embodiment, axes 48, 78 and 82 are each positioned perpendicular to one another. As stated earlier, support base 46 pivots with respect to second base portion 16 about pivot axis 48. Such pivotal movement of support base 46 will result in simultaneous movement of screen support arms 40 and 42, and projector support arm 44, because the three support arms are each secured to base 46. This retains the ninety-degree angle, or any other angle chosen during manufacturing, between the screen and the projector arm during movement of support base 46. In other embodiments, projector 36 may be secured to base 12 independently of screen 34. Second base portion 16 is shown including a recess 86 which allows projector support arm 44 to be received therein so that projector 36 may be positioned downwardly and out of the line of sight of an operator seated to manipulate keyboard 20 while viewing screen 34. The forward most edge 88 of recess 86 defines a stop position of projector support arm 44 and typically positions projector 36 and screen 34 in a preferred orientation for projecting an image to screen 34. However, support base 46 is typically frictionally connected to the base, such as by rubber stoppers at the pivot point connections, such that the support base can be positioned at any pivot angle with respect to the base and remain there due to the frictional contact. In other words, the support arm can be retained at a desired position other than on the forward most edge of recess 86.

FIG. 4 shows computer 10 in an initial stage of being collapsed, also called retraction and/or stowing of the computer, wherein braces 90 and 92 have been removed from central pivot points 94 and 96 of screen support arms 40 and 42. In another embodiment, support arms 40 and 42 may not include braces but instead include a hinge that allows the support arms to be opened to a relatively straight position wherein a slight bow or camber of the arms outwardly will retain the arms in the straight, supportive position. In the collapsed position, screen support arms 40 and 42 no longer retain screen 34 in the extended position so that spring loaded screen 34 and top support 38 will be retracted downwardly in a direction 98 and into screen storage compartment 30 of second base portion 16. Projector 36 has been pivoted about pivot axis 74 (FIG. 2) so that a rear surface 100 of the projector is positioned adjacent projector support arm 44. In this position, the projector lens system 102 is visible on a front surface 104 of projector 36. Support base 46 has been rotated rearwardly in a direction 106 about pivot axis 48 so that projector support arm 44 is removed from recess 86. Once support arm 44 is removed from recess 86, the support arm may be pivoted about pivot axis 82 so that the support arm 44 moves in direction 108 toward projector storage compartment 32 in base 16. The support base is then typically rotated forwardly in a direction opposite direction 106 to align the screen and projector for receipt within the storage compartment in the base. First base portion 14 is also shown pivoted in direction 110 about pivot axis 18 so that the first base portion will be received on top of second base portion 16. Once movement of the movable components is complete, projector 36 will be completely received within compartment 32, supports 38, 40 and 42, and screen 34 will be completely received within compartment 30 and second base portion 16 will define a relatively flat upper surface 112 for the receipt of first base portion 14 thereon.

FIG. 5 shows computer 10 in a final stage of being collapsed wherein first base portion 14 is received on and encloses top surface 112 of second base portion 16. In this closed and stowed orientation, computer 10 defines a width 56 which typically will be identical to the width of the computer in the extended orientation (FIG. 1), a height 114 which is slightly larger than the height 54 of the base in the extended orientation (FIG. 1), and a depth 116 that typically is approximately half of depth 58 of the computer in the extended orientation (FIG. 1). Moreover, depth 116 of the computer in the stowed orientation, as shown in FIG. 5, typically is less than the depth 52 of the screen in the extended position (FIG. 1), due to the retractable nature of screen 34. In the embodiment shown, depth 116 of the collapsed computer is approximately half of depth 52 of the extended screen. However, in other embodiments, depth 116 of the collapsed computer may be one third or less than the depth of the extended screen. Accordingly, the footprint of computer 10 in the collapsed orientation, as defined by depth 116 multiplied by width 56, is less than the footprint of the computer in the extended orientation. The term footprint is defined as the depth multiplied by the width of the computer, i.e., the space the computer occupies on a work surface such as a tabletop. However, the viewable size of the screen is not constrained by the size of the computer's footprint, so that the screen size may be larger than the footprint of the computer in the stowed or in the operational orientation. In the preferred embodiment, due to the thickness, i.e., height, and the relatively short depth of the collapsed computer, the computer defines a robust carrying case 118 that may withstand harsh storage conditions, when compared to the relatively large footprint of thin prior art laptop computers. Accordingly, there is described a computer having a reduced size and a robust storage and transportation capacity when compared to prior art computers and a computer that has a footprint in a stowed orientation, or in an operational orientation, that is less than the full size of its display screen when the screen is in a viewing orientation.

Figure 6:
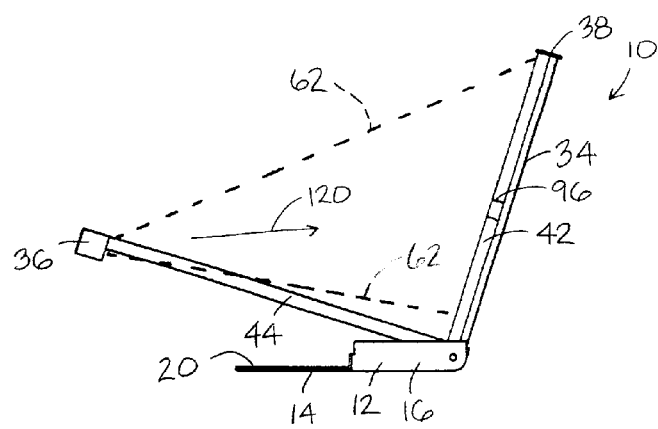
FIG. 6 is a side view of the computer of FIG. 1.

FIG. 6 shows a side view of the computer wherein projector 36 is shown projecting light 120 onto screen 34 within region of light emission 62. In the preferred embodiment, screen 34 is manufactured of a flexible material such as Mylar (Registered Trademark), polyurethane or another such flexible plastic. Additionally, screen 34 has efficient light display characteristics due to a directionally textured surface, as described in U.S. patent application Ser. No. 09/638,530, filed Aug. 14, 2000, in the name of the inventor herein, and entitled A PROJECTION SCREEN AND PROJECTION METHOD, wherein the entirety of the disclosure of said Patent Application is incorporated herein by reference. In another embodiment, screen 34 may comprise a multiplicity of reflective elements, as described in U.S. Pat. No. 5,696,625, issued on Dec. 9, 1997 to Malifaud et al. In yet another embodiment, screen 34 may comprise an untextured, flat, flexible sheath adapted for showing an image thereon. In still another embodiment, as will be discussed more fully below, screen 34 may comprise a plurality of rigid sections operatively connected to one another which allow retraction of the screen into the screen storage compartment but in the extended position will provide a full size personal computer screen. In still another embodiment the screen may be manufactured as a holographic screen wherein light is directed to a specific direction, angle or viewing zone.

Due to the efficient light display characteristics of the preferred embodiment of screen 34, in the preferred embodiment projector 36 comprises a low power, low heat-generating projector such as a light emitting diode (LED) projector. When used with the directionally textured screen as disclosed in patent application Ser. No. 09/638,530, however, such LED projectors provide a vivid and crisp image while requiring less power and generating less heat than conventional projectors, such as liquid crystal display projectors. However, the projector of the present invention may also comprise a liquid crystal display (LCD) projector including a halogen, fluorescent, or LED lamp, an organic light emitting diode (OLED), or any other projector or combination of projector elements, as known in the art.

Figure 7:
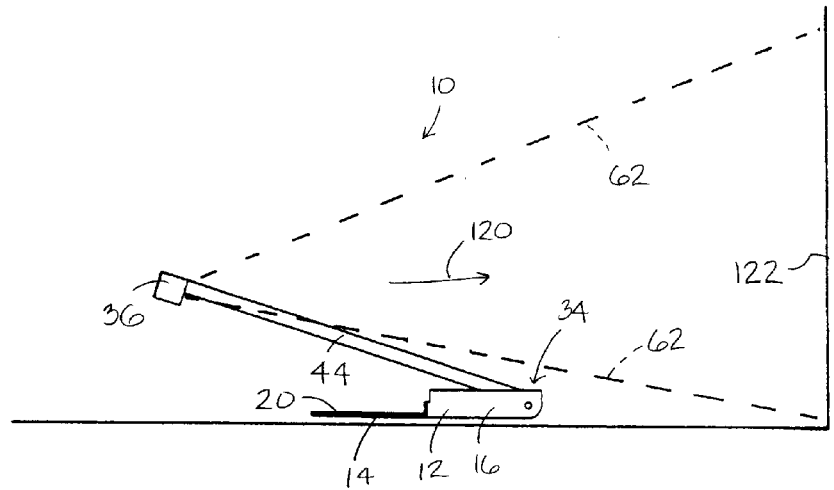
FIG. 7 is a side view of the computer of FIG. 1 with the extendable screen in the stowed orientation.

FIG. 7 shows computer 10 wherein screen 34 together with supports 38, 40 and 42 have been retracted into base 16, and projector 36 projects light 120 within a region of light emission 62 onto a displaced screen 122, such as a cubicle or office wall. In the preferred embodiment, wherein projector 36 comprises an LED projector, displaced screen 122 typically will be positioned relatively close to computer 10 such that the image projected onto screen 122 will be visible to an operator of the computer. Accordingly, the projector of computer 10 can be operated with screen 34 in the retracted position, as shown, or in the extended position (FIG. 1).

Figure 8:
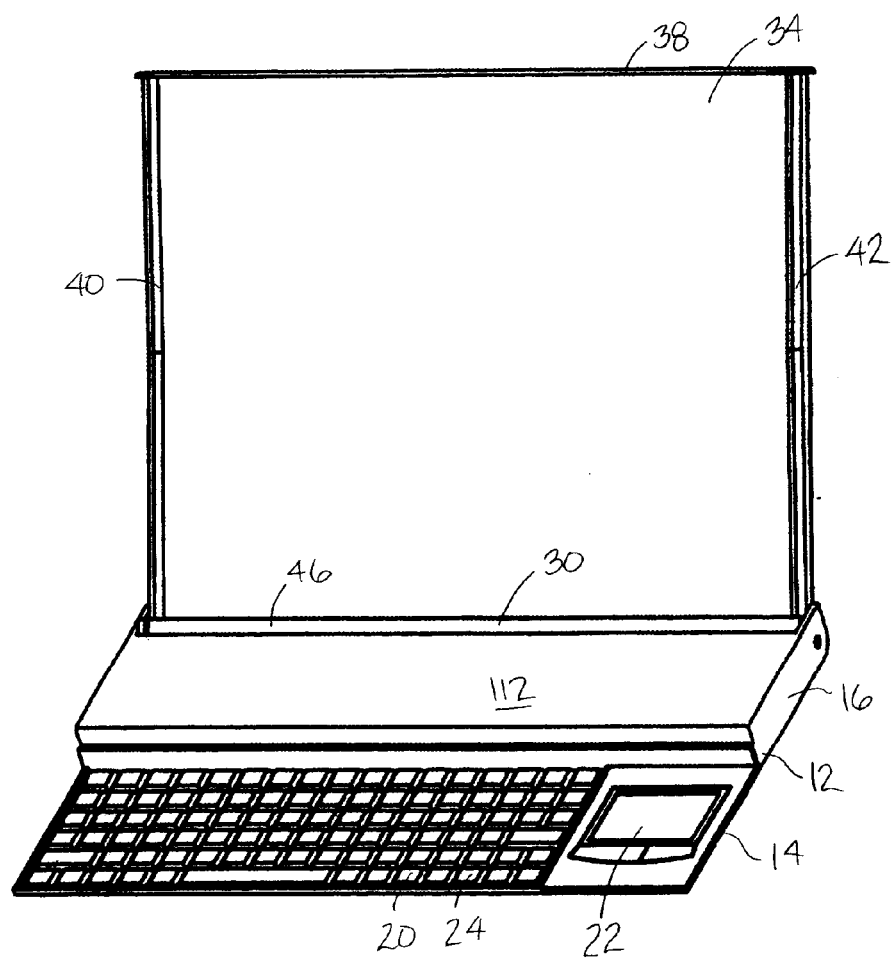
FIG. 8 is a perspective view of another embodiment of the computer which does not include an extendable projector.

FIG. 8 shows another embodiment of computer 10 wherein screen 34 functions itself as a projector so that a projector separate from screen 34 is not required. In this embodiment, screen 34, also called a display or a display device, comprises a flexible sheath of organic light emitting diodes. In other embodiments, the screen may comprise any flexible and/or retractable display device as known in the art.

Figures 9A, 9B:
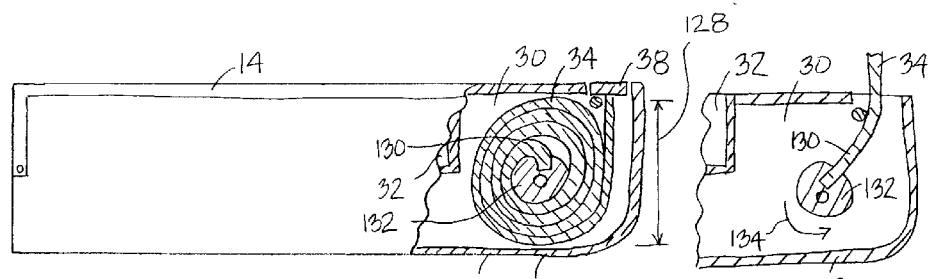
FIGS. 9A–B are side cross sectional views showing a retracted and an extended screen.

FIG. 9A shows a partial side cross sectional view of base 16 wherein screen 34 is in a retracted position and the screen comprises a flexible material. A lower end 130 of screen 34 is secured to a spring loaded drum 132 which biases screen 34 into a rolled or retracted position about the drum when screen side supports 40 and 42 (FIG. 1) are collapsed. In this stowed orientation, screen 34 defines a depth 128 which is less than depth 52 of the screen in the extended, or operational, orientation. In particular, depth 128 of the screen in the stowed position typically is less than one quarter of the depth of the screen in the operational position. Accordingly, the footprint of the screen in the stowed orientation, defined as depth 128 multiplied by width 50 of the screen, is less than the footprint of the base in both the stowed and extended orientations and is less than the footprint of the screen in the extended position. FIG. 9B shows screen 34 in an extended position wherein drum 132 has been rotated about its axis in a direction 134 to allow extension of the screen. Drum 132 may also be referred to as a retraction device or retraction means 132.

Figures 10A, 10B:
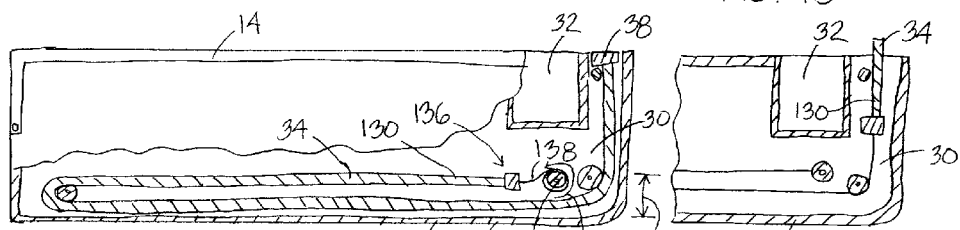
FIGS. 10A–B are side cross sectional views showing a retracted and an extended screen.

FIG. 10A shows a partial side cross sectional view of base 16 wherein screen 34 is in a retracted position and the screen comprises a flexible material. A lower end 130 of screen 34 is secured to a pulley system 136 which includes a pulley rope 138 secured to a spring loaded drum 140. Drum 140 biases screen 34 such that pulley rope 138 is wound around drum 140 when screen side supports 40 and 42 (FIG. 1) are collapsed. In this stowed orientation, screen 34 defines a depth 128 which is less than depth 52 of the screen in the extended, or operational, orientation. In particular, depth 128 of the screen in the stowed position of this embodiment typically is less than one tenth of the depth of the screen in the operational position. FIG. 10B shows screen 34 in an extended position wherein drum 140 has been rotated about its axis in a direction 142 to allow extension of the screen and the pulley rope. Drum 140 may also be referred to as a retraction device or retraction means 140.

Figures 11A, 11B:
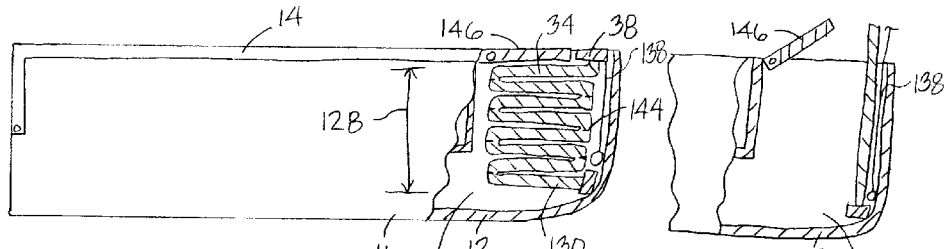
FIGS. 11A–B are side cross sectional views showing a retracted and an extended screen.

FIG. 11A shows a partial side cross sectional view of base 16 wherein screen 34 is in a retracted position and the screen comprises a flexible material. The screen material is retracted into an accordion-type, fan or folded orientation within screen storage compartment 30. Such a folded orientation may be facilitated by scores 144 or grooves cut into a back and/or front side of the screen, or other such devices, to facilitate folding of the screen in predetermined locations. The weight of the screen may be used to bias the screen into the folded position. In this embodiment, a movable door 146 may be positioned at an upper edge of compartment 30 so as to provide a large opening for receipt of the folding screen. In this stowed orientation, screen 34 defines a depth 128 which is less than depth 52 of the screen in the extended, or operational, orientation. In particular, depth 128 of the screen in the stowed position typically is less than one quarter of the depth of the screen in the operational position. FIG. 11B shows screen 34 in an extended position wherein the screen has been pulled from compartment 30 by the straightening of screen support arms 40 and 42. A spring loaded drum may be attached to a top portion of the display screen by a rope 138 that biases the screen into a stowed orientation. In this embodiment, the weight of the screen, scores 144, and/or rope 138 may be referred to as a retraction device or retraction means.

Figures 12A, 12B:
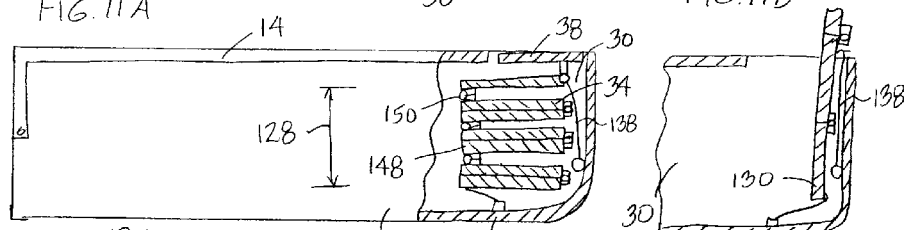
FIGS. 12A–B are side cross sectional views showing a retracted and an extended screen.

FIG. 12A shows a partial side cross sectional view of base 16 wherein screen 34 is in a retracted position and the screen comprises a plurality of rigid sections 148 in a folded or accordion type orientation. The sections are connected together by connection means such as hinges 150. The hinges may be spring loaded to bias the display into stowage compartment 30. In another embodiment, the end portions of the sections themselves may define the hinges between each of the sections. The weight of the rigid sections of the screen may be used to bias the screen into the folded position when supports 40 and 42 are collapsed. In this stowed orientation, screen 34 defines a depth 128 which is less than depth 52 of the screen in the extended, or operational, orientation. In particular, depth 128 of the screen in the stowed position typically is less than one quarter of the depth of the screen in the operational position. FIG. 12B shows screen 34 in an extended position wherein the screen has been pulled from compartment 30 by the straightening of screen support arms 40 and 42. A spring loaded drum may be attached to a top portion of the display screen by a rope 138 that biases the screen into a stowed orientation. A restraint rope or other such device may secure the lower end 130 of the screen to base 12 to secure the screen in a stationary position during use. In this embodiment, hinges 150, the weight of the screen sections, and/or either or both of the biasing ropes may be referred to as a retraction device or retraction means.

Figures 13A, 13B:
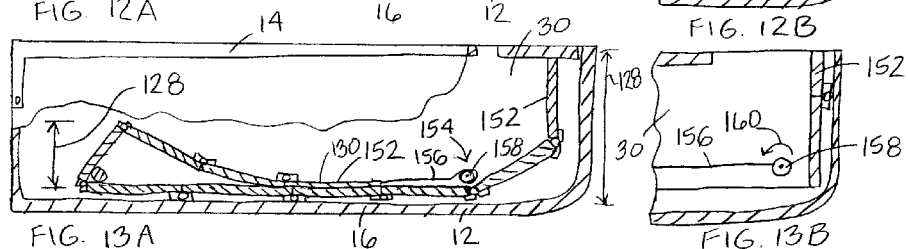
FIGS. 13A–B are side cross sectional views showing a retracted and an extended screen.

FIG. 13A shows a partial side cross sectional view of base 16 wherein screen 34 is in a retracted position and the screen comprises a plurality of rigid sections 152. A lower end 130 of screen 34 is secured to a pulley system 154 which includes a pulley rope 156 secured to a spring loaded drum 158. Drum 158 biases screen 34 such that pulley rope 156 is wound around drum 158 when screen side supports 40 and 42 (FIG. 1) are collapsed. In this stowed orientation, screen 34 defines a depth 128 which is less than depth 52 of the screen in the extended, or operational, orientation. In particular, depth 128 of the screen in the stowed position of this embodiment typically is less than one eighth of the depth of the screen in the operational position. Accordingly, the footprint of the screen in the stowed orientation, defined as depth 128 multiplied by width 50 of the screen, is less than the footprint of the base in both the stowed and extended orientations, and the footprint of the screen in the extended orientation. FIG. 13B shows screen 34 in an extended position wherein drum 158 has been rotated about its axis in a direction 160 to allow extension of the screen and the pulley rope. Drum 158 and/or pulley rope 156 may also be referred to as a retraction device or retraction means 158.

Figure 14:
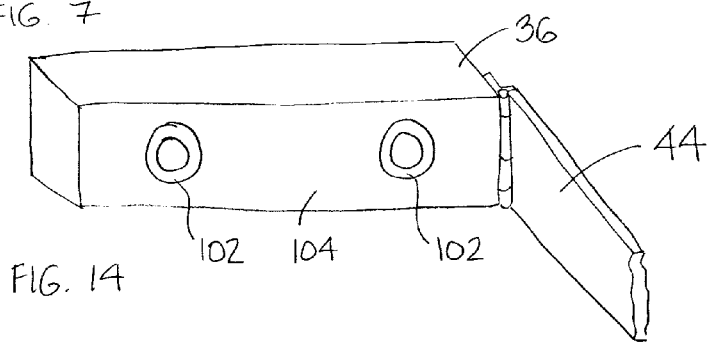
FIG. 14 shows a dual head projector.

FIG. 14 shows projector 36 mounted on projector support arm 44 wherein front surface 104 of the projector includes two projector lens systems 102. In this embodiment, the two projector lens system may allow a three dimensional image to be projected onto screen 34.

In the above description numerous details have been set forth in order to provide a more through understanding of the present invention. It will be obvious, however, to one skilled in the art that the present invention may be practiced using other equivalent designs.

I claim:
1. A portable electronic device, comprising:
   a housing that houses a processor, memory and a power system component;
   a data entry device coupled to said housing;
   a projection screen coupled to said housing that is flexible and movable between a stowed position in which said screen is contained with said housing and an extended position in which said screen extends from said housing, said screen in said extended position having an area in a principal plane that is greater than an area of a principal plane of said housing;

a projection unit including an illumination source for projecting an image created in said projection unit onto said screen; and an arm mechanism having a first end and a second end, said first end being coupled to said housing and said second end being coupled to said projection unit, said arm mechanism being sufficiently movable as to permit said projection unit to be provided in a stowed position in which the projection unit is contained with said housing and an extended position in which the projection unit is wholly separate from said housing and positioned to project an image onto said screen.

2. The computer of claim 1 wherein said data entry device includes a keyboard or pointing device.

3. The computer of claim 1 wherein said projection unit is movable between a first extended position in which projected light, is primarily directed toward said screen and a second extended position in which projected light is primarily directed other than toward said screen.

4. The image device of claim 1 wherein said projection screen has a directionally reflective surface.

5. The image device of claim 4 wherein said directionally reflective surface includes a plurality of surface elements that serve to reflect light projected from said projection unit onto said screen towards a user.

6. The image device of claim 1 wherein said data entry device is movable between a stowed position and an extended position.

7. The image device of claim 1 wherein said data entry device has an area in a principal plane that is approximately equal to or greater than that of a principal plane of said housing.

8. The device of claim 1 wherein said illumination source is a light emitting diode device.

9. The device of claim 1 wherein an image created from projection in said projection unit is held in liquid crystal display device in said projection unit.

10. A portable electronic device, comprising:

a housing that houses a processor, memory and a power system component;

a data entry device coupled to said housing;

a projection screen coupled to said housing that is flexible and movable between a stowed position in which said screen is contained with said housing and an extended position in which said screen extends from said housing, said screen in said extended position having an area in a principal plane that is greater than an area of a principal plane of said housing;

a projection unit; and an arm mechanism having a first end and a second end, said first end being coupled to said housing and said second end being coupled to said projection unit, said arm mechanism being sufficiently movable as to permit said projection unit to be provided in a stowed position in which the projection unit is contained with said housing and an extended position in which the projection unit is wholly separate from said housing and positioned to project an image onto said screen;

wherein said projection unit includes a light emitting diode device as an illumination source, said light emitting diode device illuminating an image created in said projection unit for projecting onto said screen.

11. The computer of claim 10 wherein said data entry device is movable between a stowed position and an extended position.

12. The computer of claim 10 wherein said projection unit includes a liquid crystal display device that holds an image for illumination by said light emitting diode device and projection from said projection unit.

13. The computer of claim 10 wherein said projection screen has a directionally reflective surface.

14. The computer of claim 13 wherein said directionally reflective surface includes a plurality of surface elements that serve to reflect light projected from said projection unit onto said screen toward a user.

15. The computer of claim 10 wherein said projection unit is movable between a first extended position in which projected light is primarily directed toward said screen and a second extended position in which projected light is primarily directed other than toward said screen.

16. A portable electronic device, comprising:

a housing that houses a processor, memory and a power system component;

a data entry device coupled to said housing and movable between a stowed position and an extended position;

a projection screen coupled to said housing that is flexible and movable between a stowed position in which said screen is contained with said housing and an extended position in which said screen extends from said housing, said screen in said extended position having an area in a principal plane that is greater than an area of a principal plane of said housing;

a projection unit; and an arm mechanism having a first end and a second end, said first end being coupled to said housing and said second end being coupled to said projection unit, said arm mechanism being sufficiently movable as to permit said projection unit to be provided in a stowed position in which the projection unit is contained with said housing and an extended position in which the projection unit is wholly separate from said housing and positioned to project an image onto said screen;

wherein said projection unit includes an light emitting diode device as a projection illumination source and a liquid crystal display device that contains an image for projection, said light emitting diode device illuminating said liquid crystal display device for projecting from said projection unit onto said screen.

17. The device of claim 16 wherein said projection screen has a directionally reflective surface.

18. The device of claim 17 wherein said directionally reflective surface includes a plurality of surface elements that serve to reflect light projected from said projection unit onto said screen toward a user.

19. The device of claim 16 wherein said projection unit is movable between a first extended position in which projected light is primarily directed to said screen and a second extended position in which projected light is primarily directed other than to said screen.

20. The device of claim 16 wherein said data entry device includes a keyboard.

* * * * *